(12) United States Patent
Wheeler et al.

(10) Patent No.: US 7,020,573 B2
(45) Date of Patent: Mar. 28, 2006

(54) ENHANCED TESTING FOR COMPLIANCE WITH UNIVERSAL PLUG AND PLAY PROTOCOLS

(75) Inventors: Jonathan T. Wheeler, Bothell, WA (US); James R. Boldman, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 10/755,739

(22) Filed: Jan. 12, 2004

(65) Prior Publication Data

US 2005/0154553 A1 Jul. 14, 2005

(51) Int. Cl.
*G06F 19/00* (2006.01)

(52) U.S. Cl. ............... 702/121; 702/117; 702/119; 702/121; 709/224; 714/39; 714/724; 719/321; 719/327; 703/13; 703/21; 703/22

(58) Field of Classification Search ............... 702/117, 702/119–123; 709/205, 224; 714/39, 724; 719/321, 327; 703/13, 21, 22
See application file for complete search history.

(56) References Cited

U.S. PATENT DOCUMENTS

| | | | | |
|---|---|---|---|---|
| 5,822,520 A | * | 10/1998 | Parker | 709/230 |
| 2005/0108331 A1 | * | 5/2005 | Osterman | 709/205 |

OTHER PUBLICATIONS

Chalon et al., 'An Overview of Automatic Network Configuration for IPv4 Appliances', 2001, Hewlett-Packard Company, pp. 1-16.*
Bigelow, 'Universal Plug and Play: Networking Made Easy', Sep. 16, 2003, p. 62.*
Compex, 'NAT: Netword Address Translation', Jan. 2003, pp. 1-15.*
Implementers Corporation, 'UPNP: Device Certificate Process Document', Oct. 2001, pp. 1-31.*

* cited by examiner

*Primary Examiner*—Hal Wachsman
*Assistant Examiner*—Elias Desta
(74) *Attorney, Agent, or Firm*—Workman Nydegger

(57) ABSTRACT

The present invention extends to methods, systems, and computer program products for enhanced Universal Plug and Play ("UPnP™") compliance testing. A control point (e.g., a computer system) and one or more devices (e.g., printers, wireless gateways, etc.) are network connectable (or are connected) to a common network. The control point includes a test tool that can execute scripts to simulate UPnP™ functionality. Using scripts allows more flexible and programmatic UPnP™ compliance testing. Multiple devices can be selected for testing thereby reducing the burden associated with individually testing devices on an isolated network. Test logs can be secured using digital signatures to reduce the likelihood of test logs being intentionally or inadvertently altered prior to being received at a certification authority.

29 Claims, 5 Drawing Sheets

ENHANCED TESTING FOR COMPLIANCE WITH UNIVERSAL PLUG AND PLAY PROTOCOLS

BACKGROUND OF THE INVENTION

1. The Field of the Invention

The present invention relates to testing computer systems and computer related devices for desired functionality. More specifically, the present invention relates to mechanisms for testing computer systems and computer related devices for compliance with Universal Plug and Play ("UPnP™") protocols.

2. Background and Related Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices. can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, a computer system may communicate with networked peripheral devices, such as, for example, printers, scanners and network gateways, to perform an action, such as, for example, printing or scanning a document or accessing a network. Networking peripheral devices is advantageous as it allows a number of computer systems to the share the peripheral devices. For example, any computer systems connected to a common network with a printer may be able to utilize the printer to print documents.

However, to utilize a networked peripheral device, a computer system has typically been required to have an appropriate device driver for the peripheral device. A device driver essentially converts computer system commands into compatible instructions that cause a corresponding peripheral device to perform an action. For example, a device driver for a networked printer could convert computer system commands into compatible instructions for causing the networked printer to print a document. Without an appropriate device driver, a computer system may not be able to cause a peripheral device to perform any actions.

The requirement of having an appropriate device driver can be particularly problematic when a computer system is moved between different networks. For example, a computer system that is typically connected to an office LAN (Local Area Network) may from time to time also connect to other networks (e.g., wireless networks) in various hotels or airports when a computer system user is traveling. However, there may be no way for the user to determine before traveling what peripherals are connected to the other networks. Thus, upon connecting to another network, the computer system may be prevented from compatibly communicating with connected peripheral devices due to the computer system not including the appropriate device drivers.

Further, most device drivers are designed to function with a single or limited number of peripheral devices. Since there are a large number of different peripheral devices that may be connected to a network, it would be difficult and time consuming to load device drivers for each and every possible peripheral device. Unused devices drivers also unnecessarily consume computer system resources (e.g., disk space and potentially system memory), preventing other computer system processes from utilizing the computer system resources.

Accordingly, at least one mechanism for reducing the need for different device drivers has been developed. Universal Plug and Play (which may be referred to as "UPnP™") uses common protocols, instead of device drivers, to facilitate communication between a computer system and a peripheral device. UPnP™ significantly reduces the configuration needed to enable UPnP™ compatible devices to communicate. Through the use of common protocols, peripheral devices (and computer systems) can dynamically join a network, obtain a network address, convey device capabilities and discovery the capabilities of other devices.

However, UPnP™ is, for the most part, only useful if devices and computer systems support the same set of common protocols. If devices and computer systems support different common protocols or lack support for common protocols, interoperation between some devices and/or some computer systems can be difficult or even impossible. Accordingly, testing mechanisms have been developed to test devices for compliance with UPnP™ protocols.

One testing mechanism utilizes eXtensible Markup Language ("XML") instructions to simulate UPnP™ Simple Object Access Protocol ("SOAP") commands generated at a computer system or peripheral device. A device and a computer system are connected to a common network hub. The network hub is isolated from other devices and computer systems that may interfere with testing. A tester executes a UPnP™ test tool executable (e.g., a ".exe" file) at the computer system causing a user-interface to load. The tester uses the user-interface to select one or more categories of tests (e.g., from among addressing tests, description tests, discovery tests, eventing tests, etc.) that are embedded in the test tool. The tester may also create a log file (e.g., a ".TXT" file or other text file) used to store test results.

The tester selects an appropriate control (e.g., a "Start" button) to cause the device to be tested in the selected categories. Testing a device in a specific category can include the computer system sending Simple Object Access Protocol ("SOAP") packets to the device to simulate UPnP™ commands. For example, testing control syntax of a printer device could include sending a "cancel print ID" action to the printer device. Response messages returned form the printer device (e.g., "print ID cancelled") can be stored in the log file.

When a device provides appropriate data in response to tests in a number of different test categories, the device can be viewed as complying with a UPnP™ device architecture (e.g., version 1 or version 2). A compliant device can be certified and tagged with a logo indicating that the device supports UPnP™. A central authority can determine if test results sufficiently indicate compliance with the UPnP™ device architecture. Accordingly, entities desiring to become certified can submit log files to the central authority for review. When a log file indicates that a device has responded with the appropriate data in response to SOAP instructions simulating UPnP™ commands, the central authority can certify that the device supports UPnP™. The testing and certification processes increase the likelihood of certified devices being able to appropriately interoperate using UPnP™.

Unfortunately, conventional UPnP™ compliance testing suffers from a number of deficiencies. One deficiency is related to using XML to define test cases. XML does not natively include support for performing more programmatic functions (e.g., looping, conditional statements, responding to and/or storing returned data values, etc). Thus, when using XML it may be difficult, or even impossible, to implement some tests. For example, it would difficult to create an XML based test that sends find requests to a device until the device times out. Since XML has no mechanism for storing variable data value there would be no way for the XML based test to stop sending find requests in response to the timeout message.

Another deficiency relates to isolating a computer system and device from other computer systems and devices. Conventionally, testing mechanisms lack the ability to address specific devices. Thus, there is no way to select a specific device from a number of devices that are connected to a common network. Further, when testing a device for UPnP™ compliance, other devices may interfere with the testing (e.g., sending event messages, responding to simulated queries, etc.) causing the tests to inappropriately fail. Thus during UPnP™ compliance testing, a device and computer system are typically isolated from other devices and computer systems. Accordingly, testing large numbers of devices can be time consuming as each device must individual be connected to the isolated network, tested, and then removed from the isolated network.

Another deficiency relates to the data format of log files. Since log files are typically stored in text format, the logs can be easily manipulated. For example, a tester (or other individual) could intentionally alter a log file to change failing test results to passing test results. There is also some chance that a tester (or other individual) could inadvertently alter passing test results to failing test results when reviewing a log file. However, upon receiving a log file, the certification authority has limited, if any, mechanism for determining if a received log file was altered. Thus, the certification authority may incorrectly certify or deny certification for a tested device. Accordingly, what would be advantageous are mechanisms for enhancing Universal Plug and Play testing.

BRIEF SUMMARY OF THE INVENTION

The foregoing problems with the prior state of the art are overcome by the principles of the present invention, which are directed towards systems, methods, and computer program products for enhanced testing for compliance with Universal Plug and Play ("UPnP™") protocols. A control point (e.g., a computer system) and one or more devices (e.g., printers, wireless gateways, etc) are network connectable (or are connected) to a common network. The control point includes a test tool that can execute scripts to simulate UPnP™ functionality. Using scripts allows more flexible and programmatic tests to be designed. For example, tests can include looping actions, conditional statements, and can facilitate storing variable data returned from tested devices.

The test tool can discover UPnP™ devices and present a list of discovered devices at a user-interface prior to the execution of any tests. The test tool receives a selection of at least one device that is to be tested for compliance with a UpnP™ protocol. For example, a device can be selected for testing for compliance with protocols of UPnP™ version 1 or version 2 (or future versions of UPnP™). Device selection can include selecting one or more devices from the presented list and/or by providing the test tool with one or more network address corresponding to devices. Multiple devices can be selected for testing thereby reducing the burdens associated with individually testing devices on an isolated network.

The test tool can also present a list of available scripts at the user-interface. Some scripts can be used for ad hoc testing (e.g., to test device specific functionality, or recommend or optional UPnP™ functionality) and other scripts can used for certification testing (e.g., to certify that a device complies with required UPnP™ functionality). In some embodiments, scripts satisfy specified security criteria before the scripts are made available for certification testing. The test tool receives a selection of one or more scripts that are to be executed to test the at least one device for compliance with the UPnP™ protocol. Script selection can include selecting scripts from the list presented at the user-interface.

The test tool executes the one or more selected scripts to simulate functionality of the UPnP™ protocol (or to simulate conditions that may cause a device to fail). For example, in response to selection of a start control (e.g., "clicking" on a start button) at the user-interface, the test tool can send electronic messages simulating a denial of service attack to the at least one selected device. The test tool determines if the at least one selected device appropriately responded to the simulated functionality. For example, did the at least one selected device respond in accordance the UPnP™ Device Architecture in response to the denial of service attack.

The test tool can include a secret used to secure test logs. The secret can be embedded in the test tool code so as to make identification of the secret more difficult. A digital signature can be generated from test log data and the secret and subsequently attached to the test log. A certification authority can also have access to the secret. Accordingly, when the certification authority receives a test log, the certification authority can utilize the secret to generate a second digital signature from test log data and the secret. When the digital signature and the second digital signature match, there is a reduced chance that the test log was altered after test log generation.

More specifically, a cyclical redundancy checksum ("CRC") value can be generated for the test log at the time of the test execution. The CRC value can then be stored with a secret (i.e. signed and encrypted) for extraction by the certification authority at a later time. When the test log is submitted to the certification authority, the CRC value can be generated for the test log. The CRC value generated by the certification authority can be compared against the trusted CRC value generated at the time of the test execution. A mismatch in the CRC values can indicate possible corruption of the test log.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
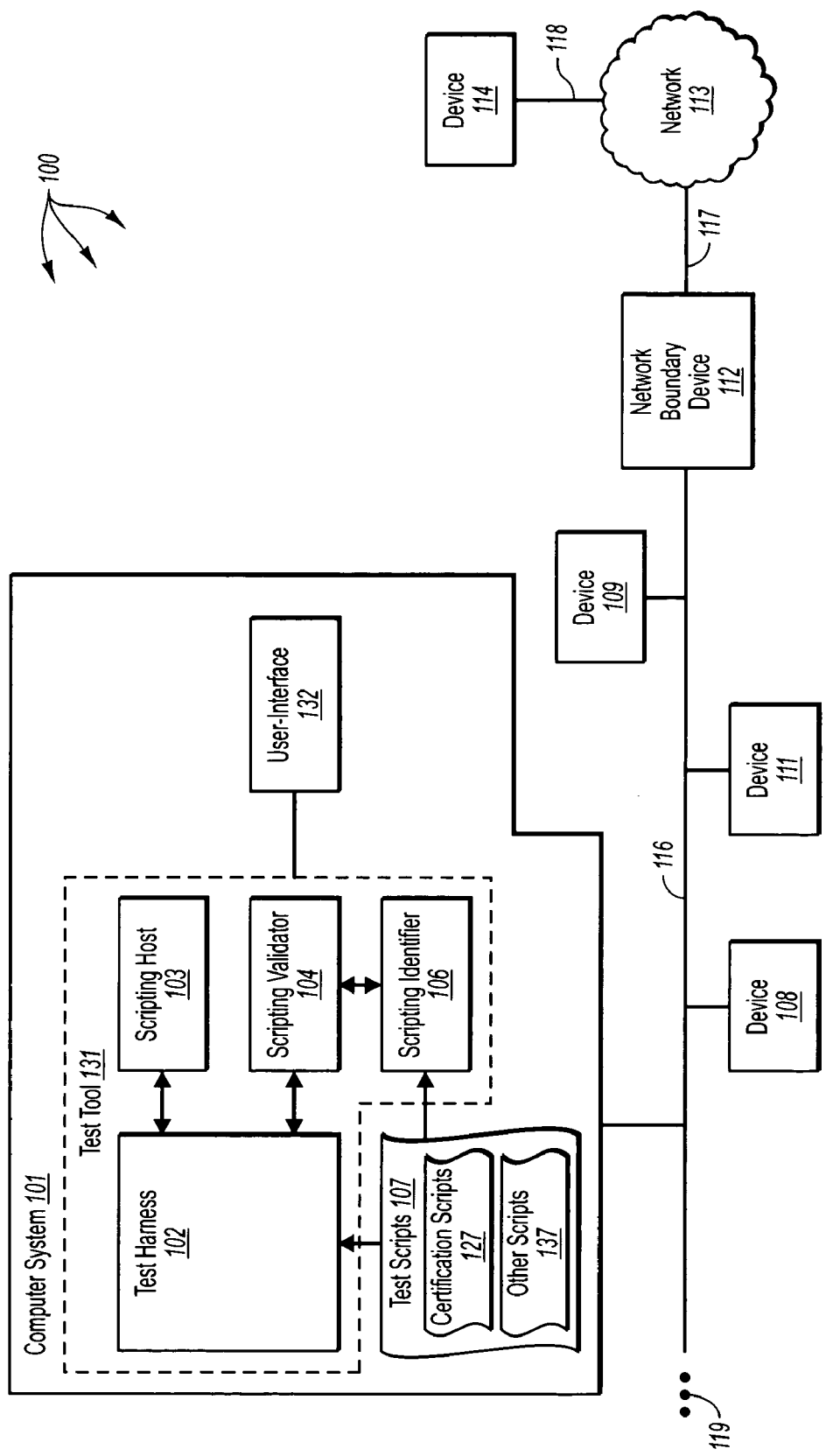
FIG. 1 illustrates an example of a network architecture that enhances testing for compliance with Universal Plug and Play protocols in accordance with the principles of the present invention.

The present invention extends to methods, systems, and computer program product for enhanced Universal Plug and Play ("UPnP™") compliance testing. A control point (e.g., a computer system) and one or more devices (e.g., printers, wireless gateways, etc.) are network connectable (or are connected) to a common network. The control point includes a test tool that can execute scripts to simulate UPnP™ functionality. Using scripts allows more flexible and programmatic UPnP™ compliance testing. Multiple devices can be selected for testing thereby reducing the burden associated with individually testing devices on an isolated network. Test logs can be secured using digital signatures to reduce the likelihood of test logs being intentionally or inadvertently altered prior to being received at a certification authority.

The embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced with many types of computer system configurations, including, personal computers, laptop computers, multi-processor systems, minicomputers, mainframe computers, peripheral devices and the like. Peripheral devices include, for example, printers, fax machines, scanners, mice, microphones, home electronic devices, network gateways, or other devices that can utilized by a computer system to perform a specified action. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

FIG. 1 illustrates an example of network architecture 100 that enhances testing for compliance with Universal Plug and Play ("UPnP™") protocols in accordance with the principles of the present invention. Network architecture 100 includes computer system 101, devices 108, 109, 111 and 114, network boundary device 112 and network 113. Computer system 101, devices 108, 109 and 111, and network boundary device 112 are each connected to network 116. Network 116 can be a portion of Local Area Network ("LAN"), such as, for example, an Ethernet segment. Ellipsis 119 represents that other computer systems and devices (not shown) can be connected to network 116.

Network boundary device 112 can be, for example, a router or gateway that separates network 116 from other networks. For example, network boundary device 112 can separate network 116 from other Ethernet segments of a common LAN, from a Wide Area Network ("WAN"), or even from the Internet. Network boundary device 112 is connected to network 113 by link 117. Link 117 can represent a link to other portions of a common LAN, a link to a WAN, or a link to the Internet. Device 114 is connected to network 113 by link 118. Device 114 can be a node of network 113. Other devices and computer systems (not shown) can also be connected to network 113.

Computer system 101, devices 108, 109, 111 and 114, and network boundary device 112 can exchange electronic messages and other message related data over network 116 and links 117 and 118. For example, computer system 101 can send a SOAP message simulating UPnP™ instructions to device 108 or device 114. The computer system and devices depicted in network architecture 100 can also exchange electronic messages and message related data with other computer systems and devices connected to network 116 and network 113.

Test scripts 107 include one or more scripts that can be executed to test for compliance with a UPnP™ protocol and can be stored external to a testing tool (e.g., test tool 131) that will execute the test scripts. Some test scripts, for example, certification scripts 127, can include instructions for testing for required UPnP™ functionality, while other test scripts, for example, other scripts 137, include instructions for testing for device specific functionality or recommend or optional UPnP™ functionality. Scripts can be written in a variety of scripting languages, such as, for example, JScript or VBScript. Scripts for testing UPnP™ protocol compliance can include programmatic functionality, such as, for example, loops, conditional statements, and storage of variable data values. Utilizing programmatic functionality, a test developer can create more flexible and comprehensive tests. For example, a script can utilize a loop instruction to send find requests to a device until a time out signal is received from the device.

Scripting host 103 can make computer system resources (e.g., objects, services, system memory, etc) available for scripts and can invoke the appropriate script engine when a script is to be executed. For example, scripting host 103 can invoke a JScript script engine when a JScript script is to be executed. Test harness 102 can interoperate with scripting host 103 to convert script instructions into electronic messages that simulate UPnP™ commands. Computer system 101 can send electronic messages simulating UPnP™ commands to test a device for compliance with UPnP™ protocols.

Scripting host 103 and test harness 102 can convert script instructions into electronic messages that simulate any of a variety of different UPnP™ protocols, such as, for example, addressing, discovery, description, control, and eventing protocols. UPnP™ protocols can utilize a protocol stack that includes lower-layer protocols, such as, for example, Device Control Protocols ("DCPs"), Simple Service Discovery Protocols ("SSDPs"), Simple Object Access Protocol ("SOAP"), HyperText Transfer Protocol ("HTTP"), User Datagram Protocol ("UDP"), Transmission Control Protocol ("TCP"), and Internet Protocol ("IP"). Accordingly, test harness 102 and scripting host 103 can also interoperate to generate and transport data elements (packets, datagrams, etc.) in accordance with one or more lower layer protocols in the protocol stack.

Test harness 102 along with scripting host 103 also expose a programming interface for the development and execution of UPnP™ test scripts. New scripts can be developed without modifying the components of test tool 131 thereby allowing more efficient script development. That is, virtually any developer (without or without access to the source code for test tool 131 can develop test scripts for testing aspects of UPnP™ functionality. For example, developers can develop scripts for testing UPnP™ functionality that differs from and/or is in addition to UPnP™ functionality tested by certification scripts. Developed scripts can be designed to test device specific functionality or recommended or optional UPnP functionality. Script development flexibility (resulting from the use programmatic script languages and the exposed programming interface) also allows for the development of scripts to test for compliance with future UPnP™ versions and even for the development of scripts to test for compliance with other architectures that use common device protocols.

Script identifier 106 can identify scripts that are to be used for UPnP™ testing. Some scripts, for example, scripts used to test for compliance with required UPnP™ functionality, may be identified as certification scripts (e.g., certification scripts 127). When a device passes various certification scripts, a certification authority can (e.g., in response to results in a test log) certify the device as UPnP™ compliant. To reduce the likelihood of altered certification scripts being used, script validator 104 can validate certification scripts before the certification scripts are executed. For example, script validator 104 can validate that a certification script included in certification scripts 127 has not been altered before the certification script is executed.

From time to time, script validator 104 can download valid CRC values for certification scripts, for example, from a certification authority. When a certification script is to be executed, script validator 104 can calculate (using the same algorithm) a CRC for the validation script. Script validator 104 can then compare a valid CRC value to the calculated CRC value. When the valid CRC value and calculated CRC value match, there is a reduced likelihood that the certification script has been altered. On the other hand, when the valid CRC value and calculated CRC value do not match, there is an increased likelihood that the certification script has been altered.

Certification scripts that have a reduced likelihood of being altered can be executed. Certification scripts that have an increased likelihood of being altered can be executed and the potential alteration indicated in a corresponding test log. Alternately, test harness 102 can prevent execution of certification scripts that have an increased likelihood of being altered. Other mechanisms in addition to CRC checks, such as, for example, checksums or digital signatures, can be used to validate a certification script.

User-interface 132 can receive user entered commands (e.g., from a tester or test developer) for configuring and initiating tests and view test logs. User-entered commands can be received from input devices (e.g., a keyboard and/or mouse) connected to computer system 101.

Devices 108, 109, 111, 114 and network boundary device 112 can be devices that are to be tested for compliance with one or more UPnP™ protocols. For example, test tool 131 can execute a script (from among a plurality of scripts included in test scripts 107) to test device 111 for compliance with a UPnP™ version 1 discovery protocol. As previously described, execution of a script can include interoperation between test harness 102 and scripting host 103. Scripting host 103 can allocate resources for script execution including system memory. Portions of allocated system memory can be utilized to store values that are returned by device 111. Execution of the instructions in a script can be altered (e.g., using conditional statements) in response to values returned from device 111.

Figure 2A:
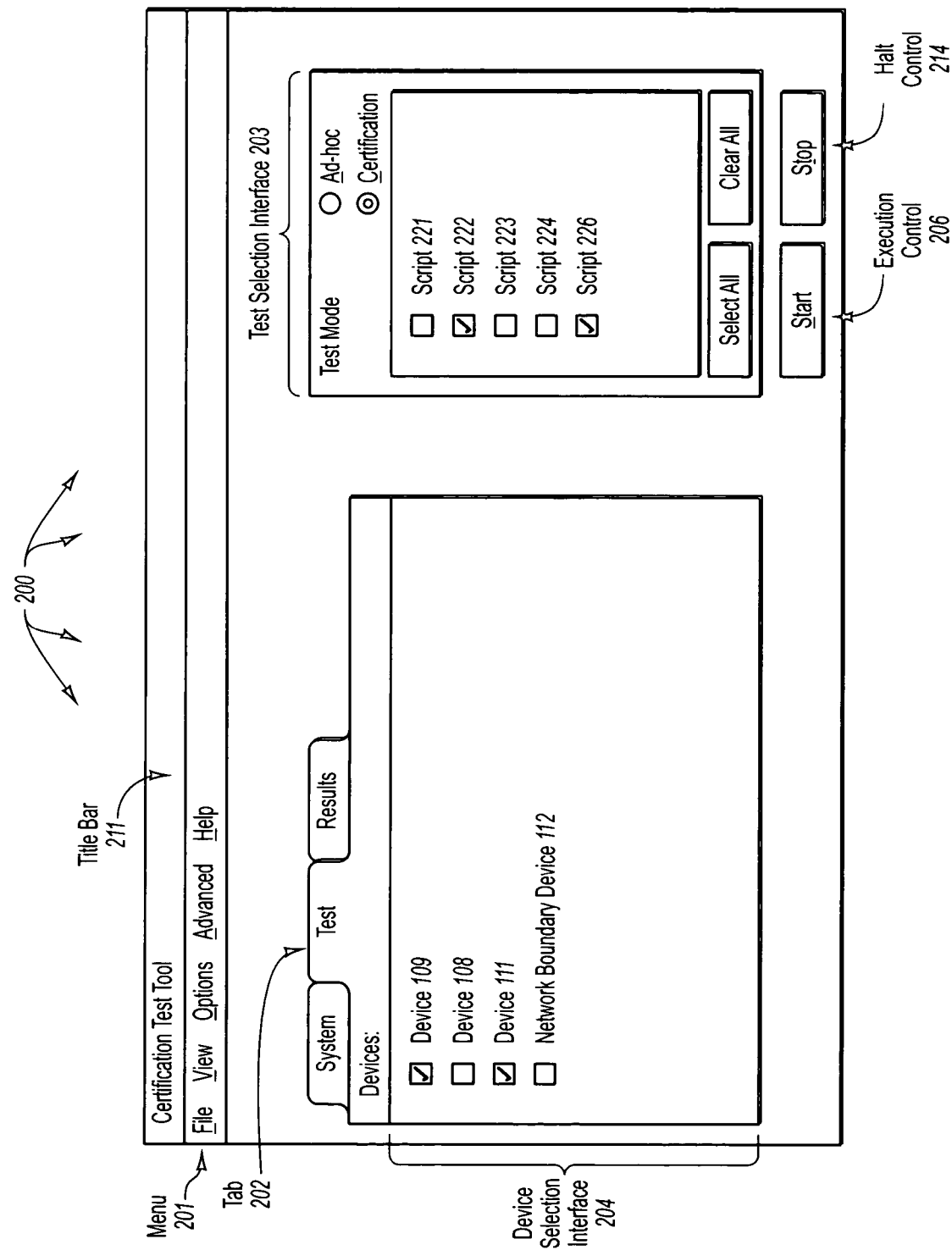
FIG. 2A illustrates a first example user-interface view for selecting devices and scripts in accordance with the principles of the present invention.

Turning now to FIG. 2A, FIG. 2A illustrates a first example user-interface view 200 for selecting devices and scripts in accordance with the principles of the present invention. It may be that user-interface 132 generates user-interface view 200. User-interface view 200 represents an example interface that can be utilized to receive device and script selections. Title bar 211 displays an indication that the user-interface is for a certification test tool. Menu 201 lists a plurality of options that can be access to configure testing functionality. Each option in menu 201 (e.g., "File", "View", etc.) can be selected to cause a drop down list of one or more additional options to be presented. A tester or test developer can select a menu option through appropriate manipulation of an input device. For example, a user can "click" on an option using a mouse or can enter an appropriate key sequence at a keyboard.

Selection of the File menu can cause the file menu options represented in Table 1 to be displayed. Table 1 also includes a description of functionality that can be implemented when a corresponding file option is selected.

TABLE 1

| Displayed File Option | Description Of Functionality |
|---|---|
| Add Test | Make a test script accessible to the Certification Test Tool. For example, add a test script to test scripts 107. |
| Save Settings | Save current Certification Test Tool settings. |
| Exit | Exit the Certification Test Tool. |

Selection of the View menu can cause the view menu options represented in Table 2 to be displayed. Table 2 also includes a description of functionality that can be implemented when a corresponding view option is selected.

TABLE 2

| Displayed View Option | Description Of Functionality |
|---|---|
| System | Present a user-interface view including current Certification Test Tool settings |
| Tests | Present a user-interface view for selecting devices and test scripts. For example, user-interface view 200. |
| Results | Present a user-interface view of test results. For example, user-interface view 250. |

Selection of the Options menu can cause the option menu options represented in Table 3 to be displayed. Table 3 also includes a description of functionality that can be implemented when a corresponding options option is selected.

TABLE 3

| Displayed Options Option | Description Of Functionality |
|---|---|
| Change Log Directory | Change directory log file is to be created in |
| UPnP Version | Configure the test tool to test for compliance with a specified UPnP version (e.g., version 1, version 2, etc.) |
| Debug Options | Configure Options for Debugging a test script |
| Halt on Failure | Toggle whether Certification Test Tool is to halt or not halt a test when a tested device fails. |
| IP Mode | Configure the test tool to run the tests over IPv4, IPv6, or both IPv4 and IPv6. |
| Loop Test | Configure the test tool to run tests indefinitely until a stop signal is received. A stop signal can result from the occurrence of an event, such as, for example, a user manually selecting a halt control (e.g., a stop button) or detecting a test failure when Halt on Failure is toggled on. |
| Restore Defaults | Restore the test tool to a default configuration. |

Selection of the Advanced menu can cause the advanced menu options represented in Table 4 to be displayed. Table 4 also includes a description of functionality that can be implemented when a corresponding advanced option is selected.

TABLE 4

| Displayed Advanced Option | Description Of Functionality |
|---|---|
| Internet Testing | Configure Certification Test Tool for testing a device over the Internet (or other WAN). This option can provide a field for entering a network address (e.g., an IP address) corresponding to device that is to be tested for compliance with a UPnP ™ protocol. |
| Attach Debugger | Facilitates the attachment of a debugger to the running process. Selecting this option will expose a process ID of the running process and pause execution until a user indicates that a debugger has been attached to the running process. |

Selection of the Help menu can cause the help menu options represented in Table 5 to be displayed. Table 5 also includes a description of functionality that can be implemented when a corresponding help option is selected.

TABLE 5

| Displayed Help Option | Description Of Functionality |
|---|---|
| Documentation | Present documentation or a link (e.g., a hyperlink) to documentation for the Certification Test Tool |
| Help | Present help or a link (e.g., a hyperlink) to help for the Certification Test Tool |
| About | Present Information about the Certification Test Tool (e.g., versioning information, licensing information, product identifier, etc). |

In user-interface view 200 tab 202 ("Tests") is selected. Selection of tab 202 can cause device selection and test selection interfaces to be displayed. For example, device selection interface 204 provides an interface for selecting devices that are to be tested for compliant UPnP™ functionality. Devices listed in device selection interface 204 can be devices that were detected on a common network, such as, for example, network 116. For example, as depicted in device selection interface 203, devices 108, 109, 111 and network boundary device 112 are listed. User-interface 132 and test tool 131 can interoperate with a network adapter of computer system 101 to detect devices on a common network.

Test selection interface 203 provides an interface for selecting tests that are to be executed. Test selection interface 203 can also provide an interface for selecting ad-hoc or certification testing. Certification testing can be selected when it is desirable to attempt to certify a device for compliance with a UPnP™ protocol or UPnP™ protocols. Selecting certification test can cause a list of certification scripts, such as, for example certification scripts 127, to be displayed. Ad-hoc testing can be selected when it is desirable to test device specific behavior or recommended or optional UPnP™ functionality. Selecting ad-hoc test can cause a list of other scripts, such as, for example, other scripts 137, to be displayed.

Execution control 206 can be selected to cause selected tests (e.g., tests implemented in scripts 222 and 226) to be executed against selected devices (e.g., devices 109 and 11)1. Halt control 214 can be selected to cause executing tests to stop executing. For example, when the test tool has been configured for looped testing (from the Options menu), halt control 214 can be selected to stop the tests from looping.

Figure 2B:
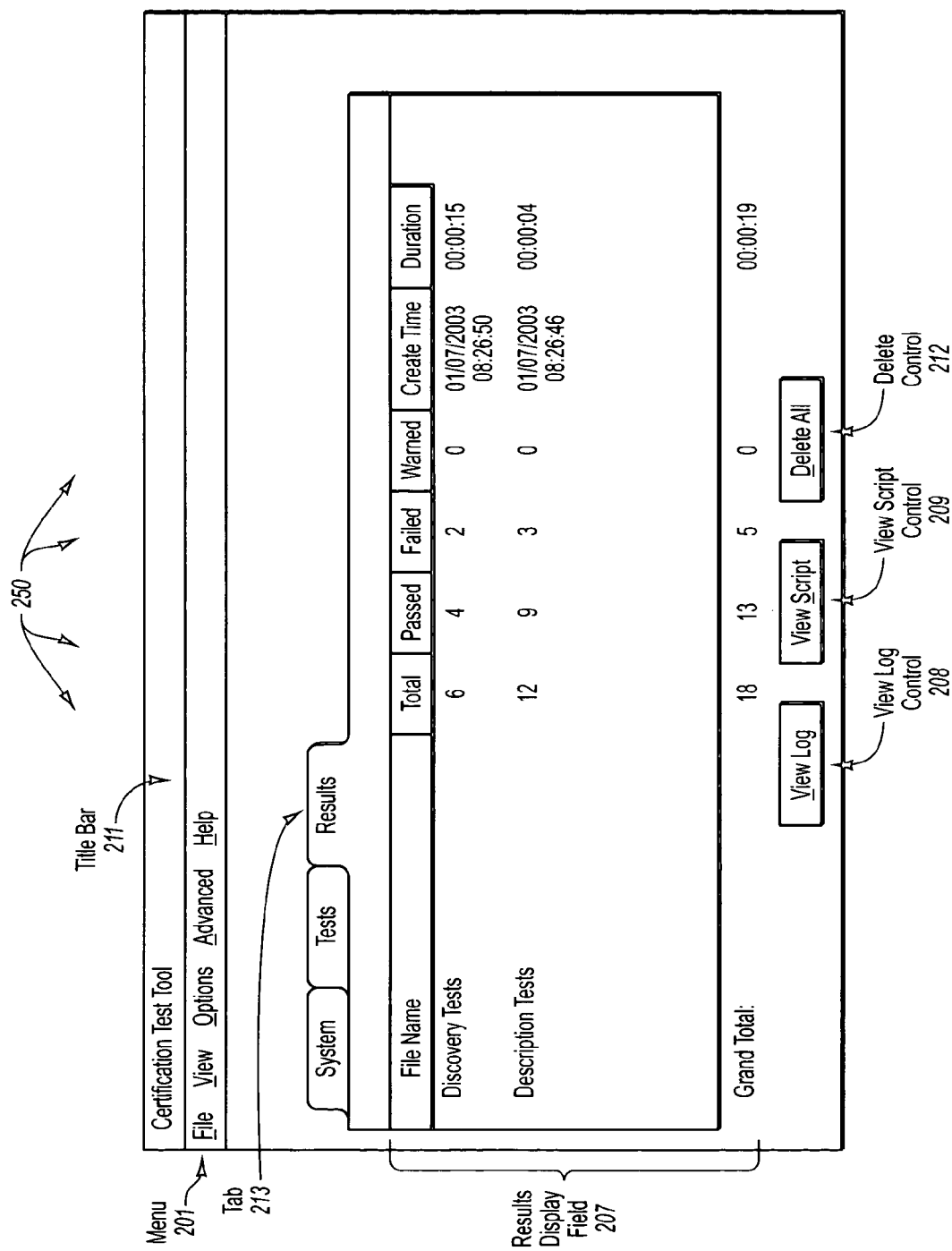
FIG. 2B illustrates a second example user-interface view for presenting test log data in accordance with the principles of the present invention.

FIG. 2B illustrates a second example user-interface view 250 for presenting test log data in accordance with the principles of the present invention. It may be that user-interface 132 generates user-interface view 250. In user-interface view 250 tab 213 ("Results") is selected. Selection of tab 213 can cause test results to be displayed. For example, results display field 207 displays results of UPnP™ compliance tests (e.g., performed by scripts selected at test selection interface 203) run against one or more devices (e.g., selected at device selection interface 204).

The log name field represents a type of test that was executed. For example, "Discovery Tests" represents that UPnP™ discovery tests were executed. The "Total" field depicts the number of tests of the represented test type that were executed. For example, the value 12 depicts that 12 UPnP™ description tests were executed. The "Passed" field depicts the number of tests of the represented test type that were passed. For example, the value 4 depicts that 4 UPnP™ discovery tests were passed. The "Failed" field depicts the number of tests of the represented test type that were failed. For example, the value 3 depicts that 3 UPnP™ description tests were failed. The "Warned" field depicts the number of tests of the represented test type that provided warnings. The "Create Time" field depicts the time the tests of the represented test type began execution. The "Duration" field depicts the length of time the tests of the represented test type executed. For example, the value "00:00:15" depicted that UPnP™ discovery tests executed for 15 seconds.

The "Grand Total:" depicts the sum of each of the fields in the results display field. For example, the value 13 depicts that a total of 13 UPnP™ tests (of various test types) were passed. View log control 208 can be selected to view a log of test results. A test log can include data similar to that displayed in results display field 207. A test log can also include additional data, such as, for example, an indication of why a specified test failed, system configuration (e.g., the configuration of computer system 101), and an indication of the device or devices that were tested. For example, a test log could indicate that a specified discovery test failed because the certification test tool did not receive a renewal notification from a tested device. Test logs can include HyperText Markup Langauge ("HTML") instructions.

Test logs can be secured using a secret that is embedded in the code of test tool 131. Embedding the secret in the code of test tool 131 can make the secret more difficult to locate. A digital signature can be generated from test log data and the secret and subsequently attached to the test log. A certification authority can also have access to the secret. Accordingly, when the certification authority receives a test log, the certification authority can utilize the secret to generate a second digital signature from test log data and the secret. The certification authority can compare the digital signature to the second digital signature.

When the digital signature and the second digital signature match, there is a reduced chance that test log data was altered after test log generation. On the other hand, when the digital signature and the second digital signature do not match, there is an increased chance that test log data was altered (either intentionally or inadvertently) after test log generation. When an increased chance of alteration is identified, the certification authority can choose not to certify a tested device even if the test log data indicates that the tested device sufficiently passed certification tests. Other mechanisms in addition to digital signatures, such as, for example, checksums or cyclical redundancy checksums ("CRCs"), can be used to secure a test log.

More specifically, a CRC value can be generated for the test log at the time of the test execution. The CRC value can then be stored with a secret (i.e., signed and encrypted) for extraction by the certification authority at a later time. When the test log is submitted to the certification authority, the CRC value can be generated for the test log. The CRC value generated by the certification authority can be compared against the trusted CRC value generated at the time of the test execution. A mismatch in the CRC values can indicate possible corruption of the test log.

View script control 209 can be selected to view a script that generated test results. Delete all control 212 can be selected to delete test results.

Figure 3:
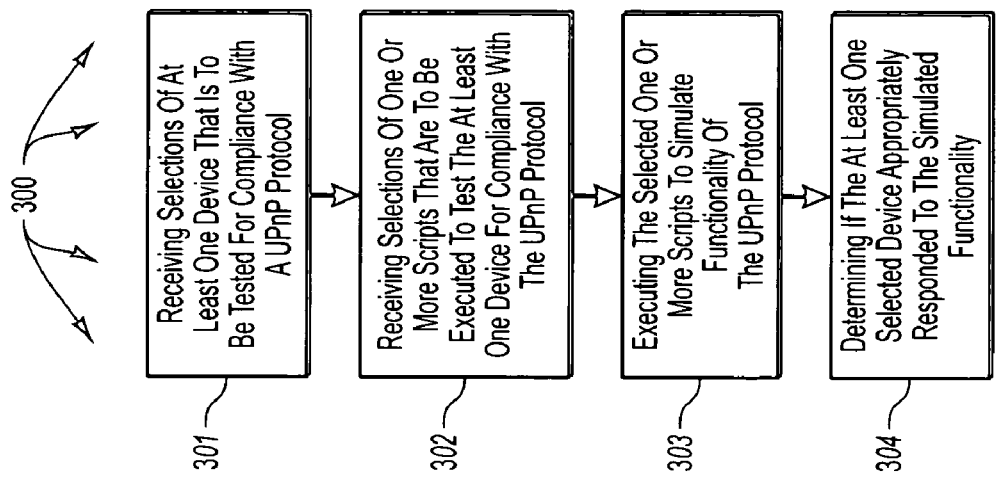
FIG. 3 illustrates an example flowchart of a method for testing for compliance with a Universal Plug and Play protocol in accordance with the principles of the present invention.

FIG. 3 illustrates an example flowchart of a method 300 for testing for compliance with a Universal Plug and Play protocol in accordance with the principles of the present invention. The method of FIG. 3 will be discussed with respect to the components of network architecture 100 and user-interfaces views 200 and 250.

The method 300 includes an act of receiving selections of at least one device that is to be tested for compliance with a UPnP™ protocol (act 301). Act 301 can include a computer system receiving selections of at least one device that is to be tested for compliance with a UPnP™ protocol. For example, computer system 101 can receive selections of one or more devices depicted in network architecture 100 that are to be tested for compliance with a UPnP™ protocol. A UPnP protocol can be an addressing, discovery, description, control, or eventing protocol as defined in accordance with a UPnP device architecture.

User-interface 132 can present user-interface view 200 that can facilitate the selection of at least one device. For example, as depicted in device selection interface 204, devices 109 and 111 have been selected. Under the Advanced menu of menu 201, a user-interface (e.g., user-interface 132) can also receive network addresses (e.g., IP addresses) that correspond to devices on other networks. For example, a tester at computer system 101 can enter an IP address that corresponds to device 114 to select device 114 for UPnP™ compliance testing. It may be that some devices are selected from device selection interface 204 and other devices are selected by entering corresponding network addresses.

The method 300 includes an act of receiving a selection of one or more scripts that are to be executed to test the at least one selected device for compliance with a UPnP™ protocol (act 302). Act 302 can include a computer system receiving a selection of one or more scripts that are to be executed to test the at least one selected device for compliance with a UPnP™ protocol. For example, computer system 101 can receive a selection of one or more scripts that are to be executed to test one or more devices depicted in network architecture 100 for compliance with a UPnP™ protocol.

User-interface 132 can present user-interface view 200 that can facilitate the selection of at least one script. For example, as depicted in test selection interface 203, tests 222 and 226 have been selected. Also depicted in test selection interface 203, certification test mode has been selected.

The method 300 includes an act of executing the selected one or more scripts to simulate functionality of the UPnP™ protocol (act 303). Act 303 can include a computer system executing the one or more selected scripts to simulate functionality of the UPnP™ protocol. For example, computer system 101 can execute scripts 222 and 226 to simulate functionality of the UPnP™ protocol (e.g., an addressing, discovery, description, contour, or eventing protocol). The simulated UPnP™ protocol functionality can facilitate the testing of selected devices, such as, for example, devices 109, 111, and 114.

The method 300 includes an act of determining if the at least one selected device appropriately responded to simulated functionality (act 304). Act 304 can include a computer system determining if the at least one selected device appropriately responded to simulated UPnP functionality. For example, computer system 101 can determine if devices 109, 111, and 114 appropriately responded to simulated UPnP™ functionality resulting from the execution of scripts 222 and 226.

An appropriate response to simulated UPnP™ functionality can vary depending in part on the UPnP™ protocol that is being tested. For example, an appropriate response to a simulated multi-cast discovery message can include a device returning a device type, a device identifier, and a pointer to more detailed information for the device. On the other hand, an appropriate response to a simulated request for a description document can include a device returning a device (and/or service) template for the device. A script can be developed to check for appropriate responses based on the type of UPnP™ functionality that is to be simulated by the script. Whether or not a device appropriately responded to simulated UPnP™ functionality can be stored in a test log as test results. The test log can be secured against tampering as previously described.

When appropriate (e.g., when certification is desired), computer system 101 can subsequently submit the test log to a certification authority.

Figure 4:
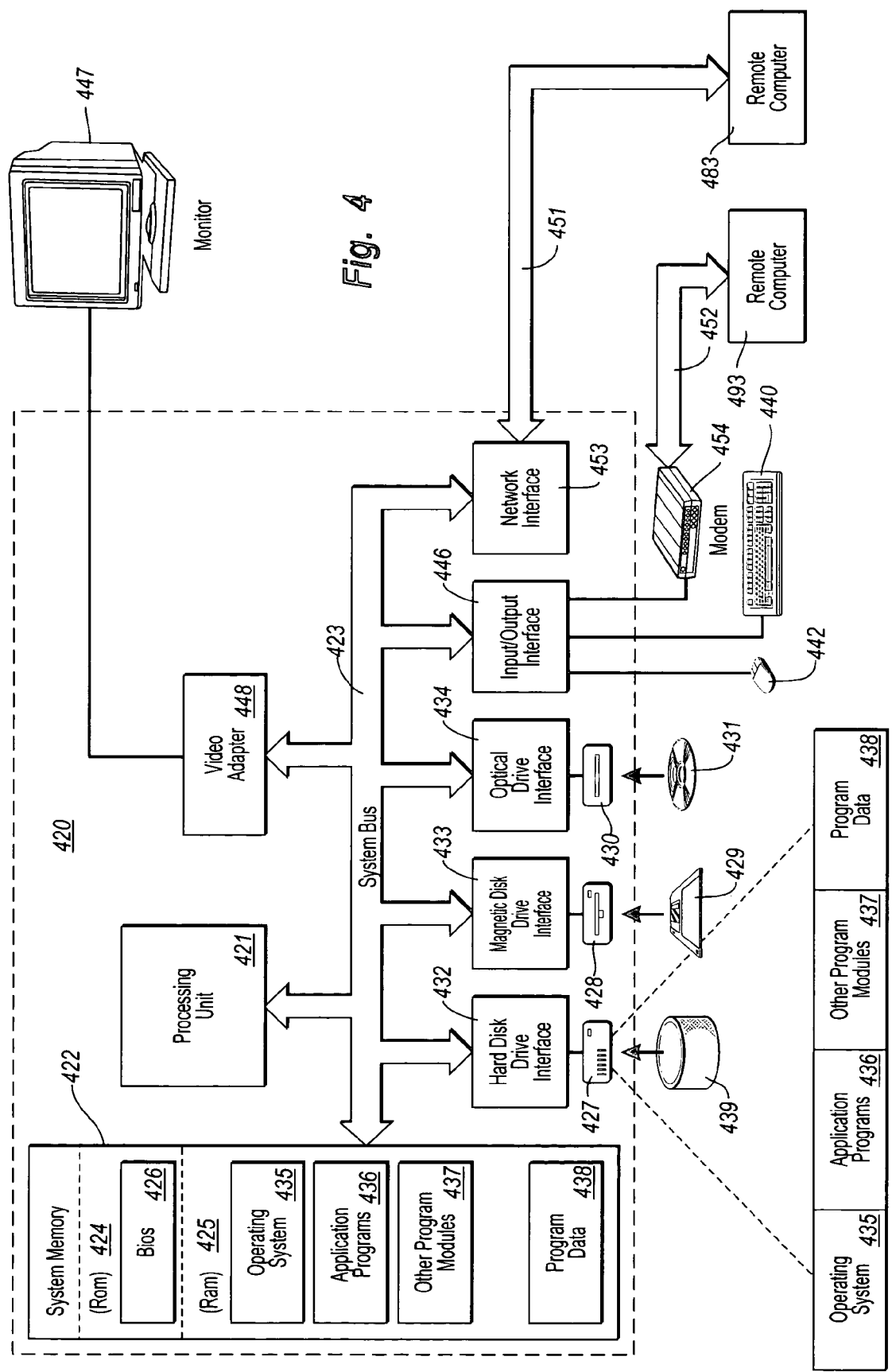
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. With reference to FIG. 4, an example system for implementing the invention includes a general-purpose computing device (e.g., a control point) in the form of computer system 420.

Computer system 420 includes a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a PCI bus, a peripheral bus, and a local bus using any of a variety of bus architectures. Computer system 420 can include one or more receptacles for receiving printed circuit boards or "cards" that interface with system bus 423. System memory 422 includes read only memory ("ROM") 424 and random access memory ("RAM") 425. A basic input/output system ("BIOS") 426, containing the basic routines that help transfer information between elements within the computer 420, such as during start-up, may be stored in ROM 424.

The computer system 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for computer system 420. Although the example environment described herein employs a magnetic hard disk 439, a removable magnetic disk 429 and a removable optical disk 431, other types of computer readable media for storing data can be used, including magnetic cassettes flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Alternatively, input devices can be connected by other interfaces, such as, for example, a parallel port, a game port, a universal serial bus ("USB") port, or a Fire Wire port. A monitor 447 or other display device is also connected to system bus 423 via video adapter 448. Computer system 420 can also be connected to other peripheral output devices (not shown), such as, for example, speakers and printers.

Computer system 420 is connectable to networks, such as, for example, an office-wide or enterprise-wide computer network, an intranet, and/or the Internet. Computer system 420 can exchange data with external sources, such as, for example, remote computer systems, computer system chasses containing network diagnostic modules, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 483 via link 451. Link 451 represents a portion of a network, and remote computer system 483 represents a node of the network (e.g., a tested device). Network interface 453 may be an interface that interoperates with a user-interface (e.g., user-interface 132) to present a list of detected devices on a network (or network segment).

Likewise, computer system 420 includes input/output interface 446, through which computer system 420 receives data from external sources and/or transmits data to external sources. Input/output interface 446 is coupled to modem 454, through which computer system 420 receives data from and/or transmits data to external sources. Alternately, modem 454 can be a Data Over Cable Service Interface Specification ("DOCSIS") modem or digital subscriber lines ("DSL") modem that is connected to computer system 420 through an appropriate interface. However, as depicted in FIG. 4, input/output interface 446 and modem 454 facilitate the exchange of data with remote computer system 493 via link 452. Link 452 represents a portion of a network, and remote computer system 493 represents a node of the network (e.g., a tested device).

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Modules of the present invention, as well as associated data, can be stored and accessed from any of the computer-readable media associated with computer system 420. For example, portions of such modules and portions of associated program data may be included in operating system 435, application programs 436, program modules 437 and/or program data 438, for storage in system memory 422. When a mass storage device, such as, for example, magnetic hard disk 439, is coupled to computer system 420, such modules and associated program data may also be stored in the mass storage device. In a networked environment, program modules and associated data depicted relative to computer system 420, or portions thereof, can be stored in remote memory storage devices, such as, for example, system memory and/or mass storage devices associated with remote computer system 483 and/or remote computer system 493. Execution of such modules may be performed in a distributed manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. At a computer system that is network connectable to one or more devices that can be tested for compliance with a UPnP™ protocol, a method for testing at least one device from among the one or more devices for compliance with a UPnP™ protocol, the method comprising:
    receiving selections of at least one device that is to be tested for compliance with the UPnP™ protocol;
    receiving selections of one or more scripts that are to be executed to test the at least one device for compliance with the UPnP™ protocol;
    executing the selected one or more scripts, execution of the selection one or more scripts causing electronic messages, which simulate the functionality of the UPnP™ protocol, to be sent to the at least one device; and
    determining if the at least one selected device appropriately responded to the simulated functionality.

2. The method as recited in claim 1, further comprising:
    the computer system detecting that the computer system and the one or more devices are connected to a common network; and
    presenting a list of the one or more devices at a user-interface.

3. The method as recited in claim 1, wherein receiving selections of at least one device comprises receiving a selection of at least one device that was identified by the computer system.

4. The method as recited in claim 1, wherein receiving selections of at least one device comprises receiving a network address that corresponds to a device.

5. The method as recited in claim 4, wherein receiving a network address that corresponds to a device comprises receiving a network address that corresponds to a device that is on a different network segment than the computer system.

6. The method as recited in claim 5, wherein receiving a network address that corresponds to a device that is on a different network segment than the computer system comprises receiving a network address that corresponds to a device that is separated from the computer system by a WAN link.

7. The method as recited in claim 1, wherein receiving selections of at least one device comprises receiving a device selection at a user-interface.

8. The method as recited in claim 1, wherein receiving selections of at least one device comprises receiving selections of a plurality of devices.

9. The method as recited in claim 1, wherein receiving a selection of one or more scripts that are to be executed to test the at least one device comprises receiving a selection of one or more scripts that are stored external to a test tool that is to be used to execute the scripts.

10. The method as recited in claim 1, wherein receiving a selection of one or more scripts that are to be executed to test the at least one device comprises receiving a selection of one or more scripts at a user-interface.

11. The method as recited in claim 1, wherein receiving a selection of one or more scripts that are to be executed to test the at least one device comprises receiving a selection that one or more certification scripts arc to be executed to attempt to certify that the at least one device is UPnP™ compliant.

12. The method as recited in claim 1, wherein the receiving a selection of one or more scripts that are to be executed to test the at least one device comprises receiving a selection that a JScript script is to be executed to attempt to certify that the at least one device is UPnP™ compliant.

13. The method as recited in claim 1, wherein receiving a selection of one or more scripts that are to be executed to test the at least one device comprises receiving a selection that a VBcript script is to be executed to attempt to certify that the at least one device is UPnP™ compliant.

14. The method as recited in claim 1, further comprising:
    validating that a selected script is a certification script.

15. The method as recited in claim 1, wherein executing the selected one or more scripts comprises test harness and a scripting host interoperating to execute the selected one or more scripts.

16. The method as recited in claim, 1 wherein executing the selected one or more scripts comprises executing a selected script to test a device for compliance with one or more of an UPnP™ addressing protocol, a UPnP™ discovery protocol, a UPnP™ description protocol, a UPnP™ control protocol, and a UPnP™ eventing protocol.

17. The method as recited in claim 1, wherein executing the selected one or more scripts comprises executing a selected script to test a device that is on a different network segment than the computer system.

18. The method as recited in claim 17, wherein executing a selected script to test a device that is on a different network segment than the computer system comprises executing a selected script to test a device that is connected to the Internet.

19. The method as recited in claim 1, wherein determining if the at least one selected device appropriately responded to the simulated functionality comprises determining the device appropriately responded based at least in part of the UPnP™ protocol that is being tested.

20. The method as recited in claim 19, wherein determining if the device appropriately responded based at least in part onto UPnP™ protocol that is being tested comprises determining if the device appropriately responded based at least in part on the UPnP™ protocol the UPnP™ protocol being selected from among a UPnP™ addressing protocol, a UPnP™ discovery protocol, a UPnP™ description protocol, a UPnP™ control protocol, and an UPnP™ eventing protocol.

21. The method as recited in claim 1, wherein determining if the at least one selected device appropriately responded to the simulated functionality comprises determining if device responses indicate that a device complies with UPnP™ Device Architecture version 1 or UPnP™ Device Architecture version 2.

22. The method as recited in claim 1, further comprising:
storing the results of the selected one or more tests in a secure test log; and
submitting the secure test log to a certification authority.

23. The method as recited in claim 1, further comprising:
configuring the selected one or more scripts to loop indefinitely prior to executing the selected one or more scripts;
receiving a stop signal; and
stopping execution of the selected one or more scripts in response to the stop signal.

24. The method as recited in claim 23, wherein receiving a stop signal comprises receiving a stop signal in response to user selection of a halt control.

25. The method as recited in claim 23, wherein receiving a stop signal comprises receiving a stop signal in response to detection of a test failure.

26. The method as recited in claim 1, further comprising:
configuring the selected one or more scripts to utilize IPv4 prior to executing the selected one or more scripts.

27. The method as recited in claim 1, further comprising:
configuring the selected one or more scripts to utilize IPv6 prior to executing the selected one or more scripts.

28. A computer system that is network connectable to one or more devices that can be tested for compliance with UPnP™ protocols, the computer system comprising:
one or more processors; and
one or more computer readable media having stored thereon a test tool for testing devices for compliance with UPnP™ protocols, the test tool being configured to:
detect devices that are connected to a common network with the computer system;
receive selections of at least one device that is to be tested for compliance with a UPnP™ device architecture;
expose a programmable interface for use in the development of programmatic test scripts that are external to the test tool such that programmatic test scripts can be developed without altering the test tool;
execute programmatic test scripts that are external to the test tool; and
determine if a device complies with a UPnP™ device architecture.

29. A computer program product for use at a computer system that is network connectable to one or more devices that can be tested for compliance with a UPnP™ protocol, the computer program product for implementing a method for testing at least one device from among the one or more devices for compliance with a UPnP™ protocol, the computer program product comprising one or more computer-readable media having stored thereon computer executable instructions that, when executed by a processor, cause the computer system to perform the following:
receive selections of at least one device that is to be tested for compliance with the UPnP™ protocol;
receive selections of one or more scripts that are to be executed to test the at least one device for compliance with the UPnP™ protocol;
execute the selected one or more scripts, execution of the selection one or more scripts causing electronic messages, which simulate the functionality of the UPnP™ protocol, to be sent to the at least one device; and
determine if the at least one selected device appropriately responded to the simulated functionality.

* * * * *

UNITED STATES PATENT AND TRADEMARK OFFICE
CERTIFICATE OF CORRECTION

| | |
|---|---|
| PATENT NO. | : 7,020,573 B2 |
| APPLICATION NO. | : 10/755739 |
| DATED | : March 28, 2006 |
| INVENTOR(S) | : Jonathan T. Wheeler et al. |

Page 1 of 1

It is certified that error appears in the above-identified patent and that said Letters Patent is hereby corrected as shown below:

In column 1, line 25, after "devices" delete ".".

In column 3, line 63, delete "UpnP™" and insert -- UPnP™ --, therefor.

In column 14, line 19, after "cassettes" insert -- , --.

In column 16, line 39, in Claim 12, after "wherein" delete "the".

In column 16, line 53, in Claim 15, after "comprises" insert -- a --.

In column 16, line 56, in Claim 16, delete "claim, 1" and insert -- claim 1, --, therefor.

In column 17, line 6, in Claim 19, after "determining" insert -- if --.

In column 17, line 7, in Claim 19, delete "of" and insert -- on --, therefor.

In column 17, line 11, in Claim 20, delete "onto" and insert -- on the --, therefor.

Signed and Sealed this

Twenty-third Day of March, 2010

David J. Kappos
*Director of the United States Patent and Trademark Office*